June 3, 1930.                    J. ZUBATY                    1,761,952
                               OIL RECTIFIER
                           Filed Sept. 16, 1927

Inventor
Joseph Zubaty
By Blackmore, Spencer & Flint
Attorneys

Patented June 3, 1930

1,761,952

UNITED STATES PATENT OFFICE

JOSEPH ZUBATY, OF FLINT, MICHIGAN, ASSIGNOR TO A C SPARK PLUG COMPANY, OF FLINT, MICHIGAN, A COMPANY OF MICHIGAN

OIL RECTIFIER

Application filed September 16, 1927. Serial No. 219,974.

This invention relates to an internal combustion engine and more specifically to a device for purifying the oil in the crankcase of said engine.

It is an object of this invention to provide an improved device for utilizing the heat from the exhaust pipe for driving off the volatile gases from the crankcase oil and conducting such gases to the carburetor intake. More specifically it is the object of this invention to provide an adjustable two way valve in the pipe leading from the oil filter to the crankcase so that any desired percentage of this filtered oil can be conducted to a rectifier for distilling off the volatile products while the remainder can be conducted directly back into the crankcase.

Other objects and advantages of the invention will appear in the course of the following description, taken in connection with the accompanying drawing, and will be particularly pointed out in the appended claims.

Figure 1:
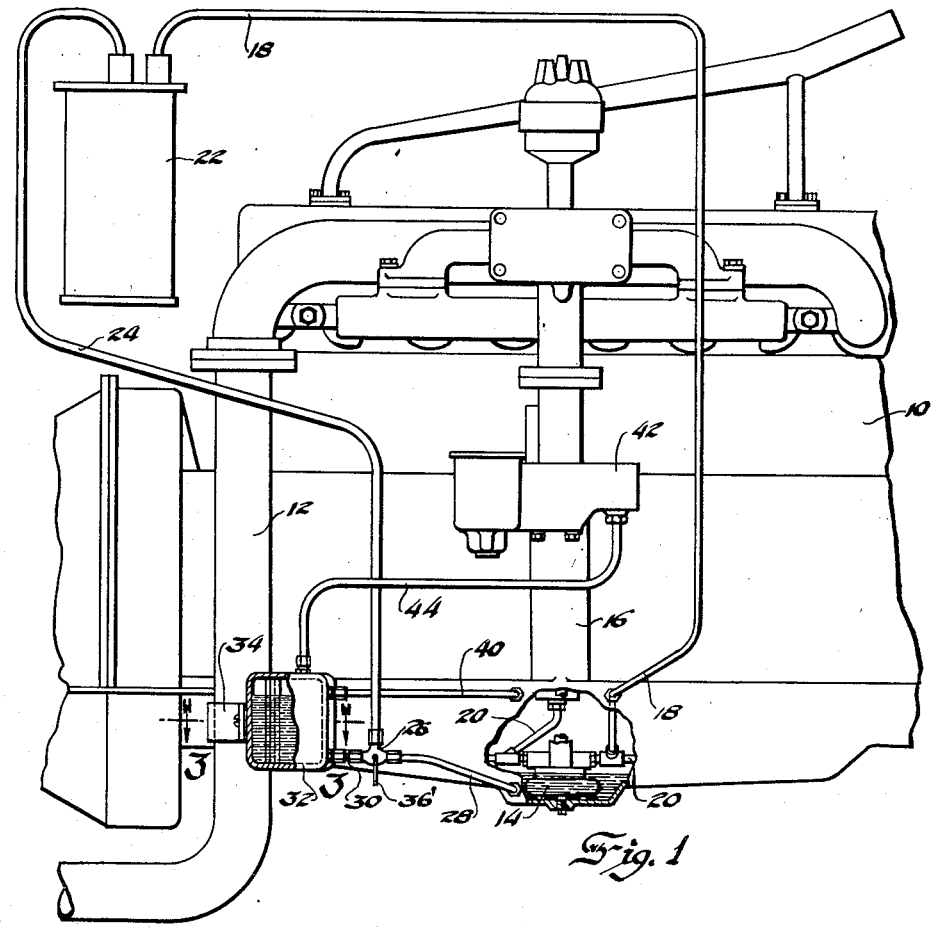
Figure 1 is a side elevation of my improved oil purifying system with parts broken away.

In the drawing, the numeral 10 indicates generally a conventional internal combustion engine provided with the exhaust pipe 12. At 14 I have indicated the conventional oil pump in the bottom of the crankcase and driven by a shaft within the housing 16. The oil pipe 18 leads from this pump to the oil filter 22, and branches 20 leading from the pump to the bearings are provided. The tube 24 carries the filtered oil downward from the filter and is provided at its lower end with a two way connection or T joint 26 provided with a pipe or branch 28 leading back into the crankcase and with a pipe or branch 30 leading to the rectifier 32. Within this T joint is the rotatable control or valve member 34 provided with a small handle 36'. Friction within the joint ordinarily is sufficient to hold the member 34 in place but if desired an additional friction element or arcuate rack may be provided to hold the handle 36' in fixed position. As illustrated, this valve member is semi-circular in section and may be rotated to divide the flow of oil down through the pipe 24 between the pipes or branches 28 and 30 in any desired proportion including 100% either way. While I have shown this valve manually adjustable, it is obvious that it may be desirable to have it thermostatically controlled by the temperature of the crankcase oil.

Figures 2, 3:
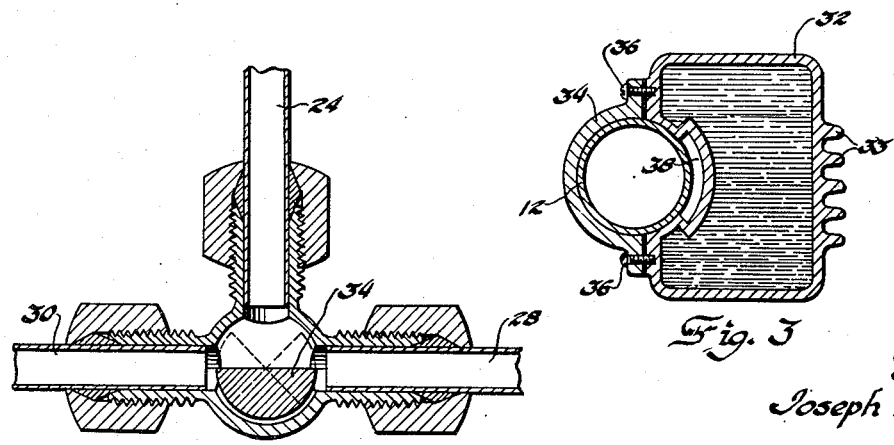
Figure 2 is a vertical longitudinal section of the adjustable two way valve.
Figure 3 is a horizontal section of the rectifier, taken along the line 3—3 of Figure 1.

The rectifier 32 comprises a closed container, shaped on one side as shown in Figure 3, for fitting against the exhaust pipe 12, and fixed firmly thereagainst by means of the complementary clamp 34 and screws 36. I find it desirable to provide a space 38 between the rectifier and exhaust pipe for preventing too rapid heating of the former. Cooling ribs or flanges 33 may be provided on the side of the receptacle 32 to avoid overheating during hot weather or fast driving. An overflow pipe 40 is provided leading from the rectifier back to and emptying into the crankcase above the level of the oil as illustrated. While the oil flows in a constant stream down this pipe, the pipe will not be filled and air can pass from the crankcase through this pipe and into the rectifier. This overflow pipe 40 maintains the oil in the rectifier at a constant height. Leading from the rectifier to the carburetor intake 42 is the pipe 44. By this construction the suction at the carburetor intake causes a constant current of air to flow from the crankcase up through the pipe 40, rectifier 32 and pipe 44 into the carburetor intake. The volatile products are thus distilled from the oil in the rectifier and conducted to the carburetor intake.

I claim:

1. In combination with an internal combustion engine including an oil pump, an oil receptacle heated from said engine and provided with a connection with the engine cranckcase, a conduit connected with said oil pump and provided with two branches, one leading to the receptacle and one to the crankcase, and means for inversely varying the sizes of the openings in said branches.

2. In combination with an internal combustion engine including an oil pump, an oil receptacle heated from said engine and provided with a connection with the engine crankcase, a conduit connected with said oil pump and including an oil filter, a plurality of branches in said conduit leading to said engine crankcase and receptacle, and means for varying the effective relative sizes of the openings in said branches.

3. In combination with an internal combustion engine including an oil pump, an oil receptacle heated from said engine and provided with a connection with the engine crankcase, a conduit connected with said oil pump and including an oil filter and provided beyond the filter with a two way connection leading to said crankcase and receptacle respectively, and a control member in said connection adjustable for varying inversely the relative sizes of the openings in said connection.

4. In combination with an internal combustion engine including an oil pump, an oil receptacle heated from said engine and provided with an overflow connection leading to the engine crankcase, a conduit leading from the oil pump and provided with branches leading to the crankcase and receptacle respectively, means for varying the relative sizes of the openings in said branches, and a conduit leading from the engine air intake to said receptacle for maintaining a constant flow of air from the crankcase through said receptacle and into said air intake.

5. In combination with an internal combustion engine including an oil pump, an oil receptacle heated from said engine and provided with an overflow connection with the engine crankcase, a conduit leading from the oil pump and provided with branches leading to the crankcase and receptacle respectively, means for varying the relative sizes of the openings in said branches, and a conduit leading from the engine air intake to said receptacle for maintaining a constant flow of air from the crankcase through said receptacle and into said air intake.

6. In combination with an internal combustion engine, including an oil pump, a conduit connected with said oil pump and provided with a branch for conducting oil to the bearings, an oil receptacle heated from the engine and provided with a connection with the crankcase, an oil line connected to said conduit and having two branches leading to said receptacle and crankcase respectively, and means for varying the relative sizes of the openings in said branches.

7. In combination with an internal combustion engine, an oil receptacle heated from said engine, an oil filter, means for maintaining a flow of oil from the engine crankcase through the filter, means for diverting the flow in any desired proportion directly into the crankcase or through said receptacle into the crankcase, and means for maintaining a current of air from said crankcase through said receptacle and into the engine air intake.

8. In combination with an internal combustion engine including an oil pump, a conduit connected with said oil pump, two branches in said conduit one of the branches conducting oil to the engine bearings, an oil filter in the second branch of said conduit, an oil receptacle heated from the engine and provided with a connection with the crankcase, a two branch connection in said second branch beyond said filter, one branch leading to said receptacle and the second to the crankcase, and means for varying the relative proportions of oil flowing through said last named branches.

9. In combination with an internal combustion engine having an oil pump, an oil purifying arrangement comprising an oil line leading from the pump, an oil filter in said line, a conduit leading from the filter, a two branch connection in said conduit, an oil heating receptacle receiving oil from one of said branches, an overflow connection from said receptacle to the crankcase, a pipe leading from the second branch to the engine crankcase, and means for varying the flow of oil in said branches.

10. The structure of claim 9, said means comprising a valve at said connection controlling both branches.

11. The structure of claim 9, said means comprising a valve at said connection said valve adapted to inversely vary the oil flow between said branches.

12. In combination with an internal combustion engine including an oil pump, an oil receptacle heated from said engine and provided with a connection with the engine crankcase, a conduit connected with said oil pump and provided with a two branch connection, one branch leading to the crankcase and the second branch to the receptacle, and means at the connection for positively and simultaneously varying the proportion of the oil passing through said branches.

13. In a lubricating system applied to an internal combustion engine having an exhaust pipe, an oil heating receptacle in said system, an arcuate portion on said receptacle directly abutting but spaced for a portion of its surface from the exhaust pipe of the engine, and means for securing said receptacle to the exhaust pipe at said abutting portion.

14. In combination with an internal combustion engine having an oil pump, an oil purifying arrangement comprising an oil line leading from the pump, an oil filter in said line, a conduit leading from the filter, a two branch connection in said conduit, an oil heating receptacle receiving oil from one of said branches, an overflow connection from said receptacle to the crankcase, a pipe leading from the second branch to the engine crankcase, means for varying the flow of oil in said branches, and a connection from the receptacle to the engine intake permitting a flow of gases from the crankcase to the intake through said overflow connection.

15. In combination with an internal combustion engine having a lubricating system including an oil pump and a filter, means for conducting oil from the pump to the filter, means for conducting oil from the filter, an oil heating receptacle in said system, means in said last named means to cause all or a portion only of the filtered oil to flow to the receptacle, and means for returning the oil from the receptacle to the system.

16. In combination with an internal combustion engine having a lubricating system including an oil pump and filter, means for conducting oil from the pump to the filter, means for conducting oil from the filter, an oil heating receptacle in said system, a valve in said last named means to cause all or a portion only of the filtered oil to flow to the receptacle, and means for returning the oil from the receptacle to the system.

17. In combination with an internal combustion engine having a lubricating system including an oil pump and a filter, means for conducting oil from the pump to the filter, means for conducting oil from the filter, an oil heating receptacle in said system, a pipe connected to said last named means and leading to the receptacle and to the lubricating system, means at the intersecton of said pipe and means to cause all or a portion only of the filtered oil to flow to the receptacle, and means for returning the oil from the receptacle to the system.

18. In combination with an internal combustion engine having a lubricating system including an oil pump and a filter, means for conducting oil from the pump to the filter, means for conducting oil from the filter, an oil heating receptacle in said system, a pipe connected to said last named means and leading to the receptacle and to the lubricating system, a valve at the intersection of said pipe and means to cause all or a portion only of the filtered oil to flow to the receptacle, and means for returning the oil from the receptacle to the system.

19. In combination with an internal combustion engine having a lubricating system including an oil pump and a filter, means for conducting oil from the pump to the filter, means for conducting oil from the filter, an oil heating receptacle in said system, means in said last named means to cause all or a portion only of the filtered oil to flow to the receptacle, means for returning the oil from the receptacle to the system, and means connecting the receptacle to the carburetor to draw off vapors.

20. In combination with an internal combustion engine having a lubricating system including an oil pump and a filter, means for conducting oil from the pump to the filter, means for conducting oil from the filter, an oil heating receptacle in said system, a pipe connected to said last named means and leading to the receptacle and to the lubricating system, means at the intersection of said pipe and means to cause all or a portion only of the filtered oil to flow to the receptacle, means for returning the oil from the receptacle to the system, and means connecting the receptacle to the carburetor to draw off vapors.

In testimony whereof I affix my signature.
JOSEPH ZUBATY.